United States Patent [19]

Fujii et al.

[11] Patent Number: 4,552,414
[45] Date of Patent: Nov. 12, 1985

[54] HYDRAULIC CIRCUIT FOR AN ANTI-LOCKING BRAKING SYSTEM

[75] Inventors: Etsuo Fujii; Makoto Satoh, both of Saitama; Mitsuo Toyoda, Tokyo, all of Japan

[73] Assignee: Honda Giken Kogyo Kabushiki Kaisha, Tokyo, Japan

[21] Appl. No.: 541,732

[22] Filed: Oct. 13, 1983

[30] Foreign Application Priority Data

| Oct. 29, 1982 | [JP] | Japan | 57-164871 |
| Oct. 31, 1982 | [JP] | Japan | 57-164674 |
| Nov. 15, 1982 | [JP] | Japan | 57-172757 |
| Nov. 15, 1982 | [JP] | Japan | 57-172758 |

[51] Int. Cl.⁴ ............................................. B60T 8/02
[52] U.S. Cl. .................................... 303/115; 60/581; 303/119
[58] Field of Search ............... 303/113, 114, 115, 116, 303/119, 61–63, 68–69, 10–12, 92, 91, 100; 188/181, 345, 352; 60/579–582, 591

[56] References Cited

U.S. PATENT DOCUMENTS

| 3,521,934 | 7/1970 | Leiber | 303/119 |
| 4,340,257 | 7/1982 | Belart | 303/114 |
| 4,421,359 | 12/1983 | Hayashi et al. | 303/116 X |
| 4,438,629 | 3/1984 | Sato et al. | 303/113 X |

FOREIGN PATENT DOCUMENTS 58-33556  2/1983  Japan .

Primary Examiner—Douglas C. Butler
Attorney, Agent, or Firm—Wenderoth, Lind & Ponack

[57] ABSTRACT

A hydraulic fluid circuit for use in an anti-lock braking system of a vehicle includes a relieved hydraulic fluid chamber of a hydraulic pressure modulator and a reservoir of a master brake cylinder which are operatively connected with each other by way of a hydraulic fluid line. Hydraulic operating fluid existing in the relieved hydraulic fluid chamber is relieved into the reservoir. The reservoir of the master brake cylinder is disposed at a position higher than the level of the suction joint or inlet of the relieved hydraulic fluid chamber of the hydraulic pressure modulator.

1 Claim, 3 Drawing Figures

HYDRAULIC CIRCUIT FOR AN ANTI-LOCKING BRAKING SYSTEM

BACKGROUND OF THE INVENTION

1. Field of the Invention

The present invention relates in general to a braking system of a vehicle, and more particularly to improvements in or relating to a hydraulic circuit of an anti-locking breaking system for use in an on-land vehicle.

2. Description of the Prior Art

In general, it is known that with the use of an anti-lock braking system in a passenger carrying vehicle which operates at a relatively high speed, the rotating velocity of the vehicle wheels is detected by way of a revolution velocity sensor, and the thus-obtained speed data is electronically differentiated to provide a wheel acceleration signal at an electronic control section. In accordance with this wheel acceleration signal, there is determined a sign or transient symptom of a tendency of a wheel or wheels of the vehicle to become locked when the brakes are applied during cruising of the vehicle at a relatively high speed. Upon such determination a suitable operating command is given to a modulator or hydraulic regulating mechanism, so that a suitable counter-operation to ensure maneuverability or operating stability of the vehicle may be taken quickly, and braking force is applied in such a manner that the vehicle wheels are allowed to slip to an appropriate extent, so that the vehicle may positively be stopped within the shortest possible braking distance. In this connection, attention is directed to Japanese Patent Laid-Open Application No. 33,556/1983 (Tokukaisho No. 58-33556).

In such a typical construction of the anti-lock braking system as stated above, it is generally known that while there is employed control means to enable a hydraulic braking force to be relieved to the reservoir of a master cylinder in a hydraulic braking circuit, while the operating pressure of the hydraulic fluid is regulated at the modulator or hydraulic regulating mechanism, it is very possible that air is trapped or introduced into the hydraulic fluid circuit when the relieving of such braking pressure is made irregularly at the modulator. When such air is entrapped within the hydraulic circuit for relieving a braking pressure from the modulator to the reservoir of the master cylinder, this particular local zone of the hydraulic circuit is eventually detected by the modulator as being in a negative working pressure condition. This then would affect improperly the delicate hydraulic pressure regulation to be rendered by way of the modulator, which naturally is undesirable for the regular pressure control of the hydraulic system. Also, when there occasionally is entrapped air in the hydraulic line for relieving the braking pressure from the working system during the operation of the braking system because of breakage of the hydraulic line or because of a loose connection of the line, and when the thus entrapped air is redirected to the modulator, such condition would result in improper hydraulic pressure regulation of the modulator.

The present invention relates to the provision of a solution to such inconveniences and difficulties in the maintenance of proper hydraulic braking pressure regulation of the hydraulic pressure modulator or pressure regulating mechanism in a hydraulic braking system as experienced in a conventional hydraulic braking system for use in a vehicle.

SUMMARY OF THE INVENTION

It is therefore a primary object of the present invention to provide an improved hydraulic circuit for an anti-lock braking system for use in a vehicle, which achieves the advantageous and useful function that air entrapped within a hydraulic line for relieving hydraulic breaking pressure into a reservoir of a master brake cylinder may quickly be discharged from the working hydraulic circuit through the reservoir of the master cylinder, so that thus entrapped air is prevented from being left within the pressure relieving line and that such air is prevented from being redirected to the modulator.

It is another object of the present invention to provide an improved hydraulic circuit for an anti-lock breaking system which ensures an efficient and fail-safe operation, whereby the anti-lock brake system will positively serve its normal function under a condition wherein the hydraulic line for relieving the braking pressure from the hydraulic pressure modulator to the reservoir of the master brake cylinder is occasionally caused to leak hydraulic operating fluid due to breakage of or loose connection at the hydraulic line.

It is still another object of the present invention to provide an improved hydraulic circuit for an anti-lock braking system which ensures an advantageous and efficient operation, whereby the hydraulic operating fluid is continuously and securely filled into the hydraulic pressure modulator, and the hydraulic brake pressure under due control is properly and efficiently relayed to the hydraulic brake system.

According to the present invention, there is provided an improved hydraulic fluid circuit for use in an anti-lock braking system of a vehicle of tye type including a relieved hydraulic fluid chamber of hydraulic pressure modulator means and a reservoir of master brake cylinder means which are operatively connected with each other by way of hydraulic fluid line means, and with hydraulic operating fluid existing in the relieved hydraulic fluid chamber being relieved into the reservoir. The reservoir of the master brake cylinder means is disposed at a position higher than the level of the suction joint portion or inlet of the relieved hydraulic fluid chamber of the hydraulic pressure modulator means.

The principle, nature and details of the present invention, as well as advantages thereof, will become more apparent from the following detailed description of a preferred embodiment of the invention, when read in conjunction with the accompanying drawings, in which like parts are designated by like reference numerals.

DETAILED DESCRIPTION OF THE INVENTION

The present invention will now be described in detail by way of example of a preferred embodiment thereof in conjunction with the accompanying drawings.

Figure 1:
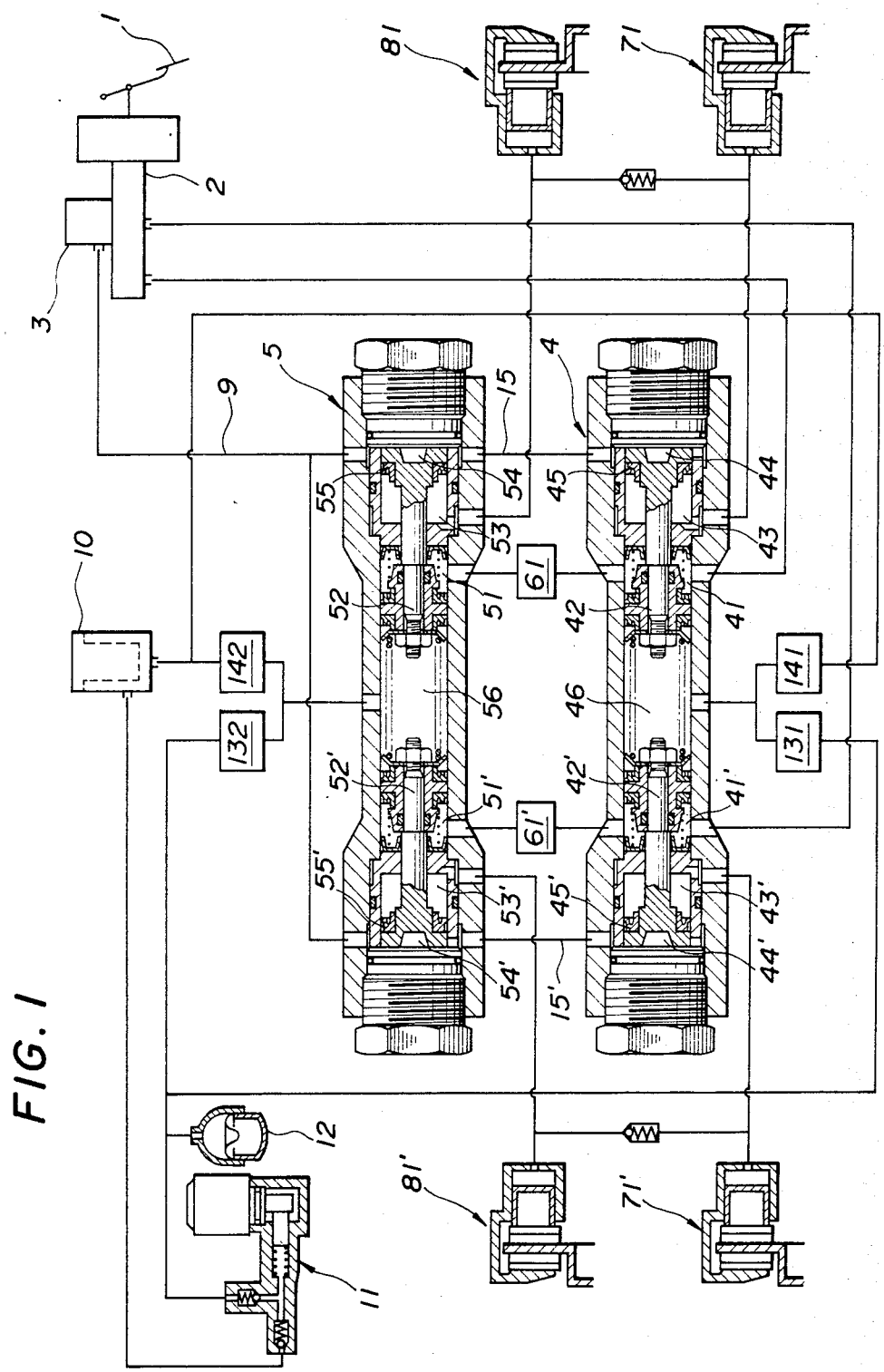
FIG. 1 is a schematic circuit diagram, partly in block representation, which shows a preferred embodiment of a hydraulic operating system for use in an anti-lock braking system according to the present invention.

Now, referring to FIG. 1, there is shown the preferred embodiment of an improved hydraulic operating system for use in the anti-lock braking system according to the present invention, in which there are provided a brake pedal 1, a tandem type master brake cylinder 2, a first hydraulic pressure modulator 4 including primary hydraulic fluid chambers 41, 41', a second hydraulic pressure modulator 5 including primary hydraulic fluid chambers 51, 51', and hydraulic pressure control valves 61, 61'. With such construction, as the brake pedal 1 is depressed, the primary hydraulic fluid chambers 41, 41' in the primary hydraulic pressure modulator 4 are charged with the hydraulic operating fluid under braking pressure from the master brake cylinder 2, and then the hydraulic operating fluid is also directed to the primary hydraulic fluid chamber 51, 51' of the second hydraulic pressure modulator 5 through the primary hydraulic pressure modulator 4 and the hydraulic pressure control valves 61, 61', respectively. When the pressure of the hydraulic operating fluid is relayed to the primary hydraulic fluid chambers 41, 41' of the hydraulic pressure modulator 4, hydraulic cylinder rods 42, 42' are caused to move toward each other, thus transmitting the hydraulic braking force to secondary hydraulic pressure chambers 43, 43', and right and left front wheel brakes 71, 71' of the vehicle are respectively caused to operate in braking action in accordance with the hydraulic pressure output from each of the secondary hydraulic pressure chambers 43, 43'. Similar operation occurs likewise with regard to the second hydraulic pressure modulator 5. That is, as each of cylinder rods 52, 52' is caused to travel toward each other, thus transmitting the hydraulic braking force to secondary hydraulic pressure chambers 53, 53', right and left rear wheel brakes 81, 81' of the vehicle are respectively caused to operate in braking action in accordance with the hydraulic pressure output from each of the secondary hydraulic fluid pressure chambers 53, 53'. Also, on the rear part of each of the hydraulic cylinders rods 42, 42' and the cylinders rods 52, 52' of the hydraulic pressure modulators 4 and 5, respectively, there are provided respective relieved hydraulic fluid chambers 44, 44' and 54, 54'. The relieved hydraulic fluid chambers 44, 44' of modulator 4 are connected with the relieved hydraulic fluid chambers 54, 54' of hydraulic pressure modulator, respectively, by lines 15, 15', respectively, and relieved hydraulic fluid chambers 54, 54' of the second hydraulic pressure modulator 5 are connected to the reservoir 3 of the master brake cylinder 2 by way of a hydraulic fluid line 9. Cup-shaped sealing members 45, 45' and 55, 55', respectively, are mounted integrally on sides of each of the hydraulic cylinders rods 42, 42' and 52, 52'. Such sealing members partition each of the relieved hydraulic fluid chambers 44, 44' and 54, 54' from the respective secondary hydraulic pressure chambers 43, 43' and 53, 53', in a manner such that the hydraulic operating fluid is allowed to pass from each of the relieved hydraulic fluid chambers 44, 44' and 54, 54' to the respective secondary hydraulic pressure chambers 43, 43' and 53, 53', but is prevented from leaking in the opposite direction.

Also, hydraulic operating fluid delivered from a reservoir 10 for the anti-lock braking control is once pressurized by way of a hydraulic pump 11 and accumulated preliminarily in a hydraulic accumulator 12, so the thus accumulated fluid can be supplied to each of anti-lock braking fluid control chambers 46, 56 of the hydraulic pressure modulators 4, 5 through normally closed type solenoid valves 131, 132, respectively. Further, each of the anti-lock braking fluid control chambers 46, 56 is operatively connected to the reservoir 10 through normally open type solenoid valves 141, 142, respectively. In this connection, it is noted that each of these solenoid valves 131, 132 and 141, 142 is designed to be driven to open and close respectively in accordance with a driving command from an electronic control section, not shown, in such a manner that the solenoid valves 131, 132 are caused to be opened and the solenoid valves 141, 142 closed during an anti-lock braking operation, while each of these solenoid valves 131, 132 and 141, 142 is caused to return its normal position during a non-braking or normal cruising operation of the vehicle, respectively.

According to the construction of the anti-lock braking system as stated hereinbefore, when the primary hydraulic fluid chambers 41, 41' and 51, 51' of the hydraulic pressure modulators 4 and 5 are subjected to hydraulic braking pressure so that each of the front and rear wheel brakes 71, 71' and 81, 81' is operated to perform braking action by the hydraulic output from secondary hydraulic pressure chambers 43, 43' and 53, 53', respectively, and when a command for anti-lock braking operation is given from the electronic control section of the vehicle, hydraulic operating fluid under pressure (to a level exceeding that due braking pressure) is then delivered from pump 11 into the anti-lock braking fluid control chambers 46, 56 of the hydraulic pressure modulators 4, 5 through the solenoid valves 131, 132. Accordingly, each of the hydraulic cylinders rods 42, 42' and 52, 52' is urged backwardly toward its original position, thus achieving regulation of the braking pressure. At this moment, the hydraulic operating fluid left in each of the relieved hydraulic fluid chambers 44, 44' and 54, 54' of the hydraulic pressure modulators 4, 5 is then caused to be returned to the reservoir 3, thereby causing part of the hydraulic braking pressure accumulated in each of the secondary hydraulic pressure chambers 43, 43' and 53, 53' to be relieved to the reservoir 3.

Under such condition, if air is left entrapped within the hydraulic fluid line 9 which communicates the relieved hydraulic fluid chambers 44, 44' and 54, 54' of the hydraulic pressure modulators 4, 5 with the reservoir 3, this air existing in the form of bubbles in the hydraulic operating fluid would then be brought into each of the secondary hydraulic pressure chambers 43, 43' and 53, 53' from the relieved hydraulic fluid chambers 44, 44' and 54, 54' as it is entrained with the hydraulic operating fluid when the braking system is released to its disengaged position.

Figure 2:
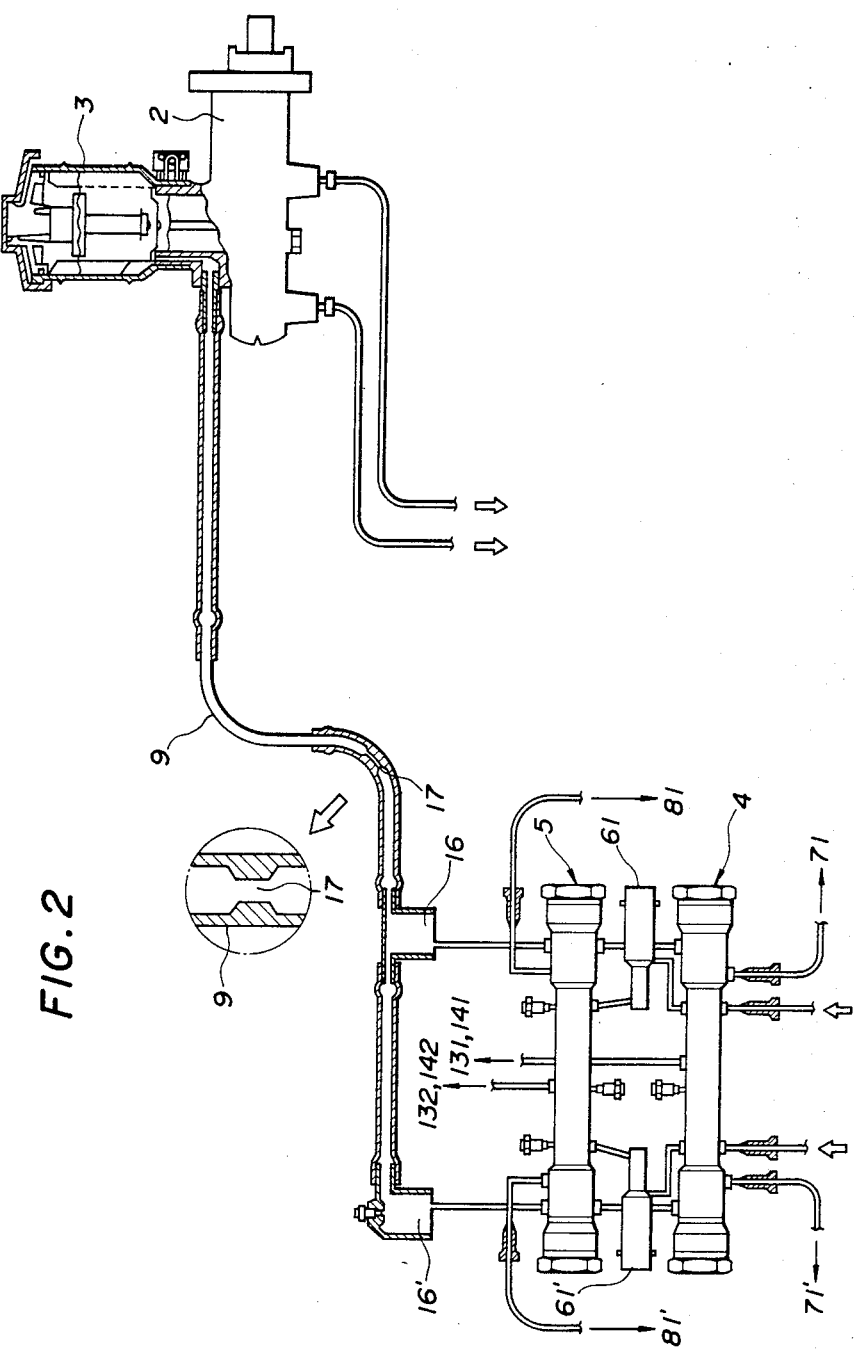
FIG. 2 is a schematic circuit diagram showing a preferred embodiment of a hydraulic operating circuit of the anti-lock braking system according to the present invention.

In this specific embodiment of the anti-lock braking system according to the present invention, as typically shown in FIG. 2, the reservoir 3 of the master brake cylinder 2 is disposed at a higher position than the level of the suction joint of or inlet connection to each of the relieved hydraulic fluid chambers 44, 44' and 54, 54' of the hydraulic pressure modulators 4 and 5. By virtue of this specific arrangement of the reservoir 3 of the master brake cylinder 2 in the braking system, there is provided such an advantageous effect that, even it there occurs an air entrapping or vapor lock condition in the inside of the hydraulic fluid line 9, this air entrapped within the line 9 will move upwardly due to its own buoyancy, thus leading to the reservoir 3 where it is eventually ready to be discharged out of the fluid system, instead of dwelling or remaining inside the hydraulic fluid line 9.

Also, according to this specific embodiment of the present invention, as also shown in FIG. 2, there are provided hydraulic pressure buffer chambers 16, 16' which are adapted to accumulate the hydraulic operating fluid within the upper part of each of the relieved hydraulic fluid chambers 54, 54' and in the hydraulic fluid line 9 which connects the reservoir 3 and the relieved hydraulic fluid chambers 54, 54' on the side of the second hydraulic pressure modulator 5. With such provision of buffer chambers 16, 16', when there occasionally occurs a breakage of the hydraulic fluid line 9 to cause some fluid to leak from the line 9 extending between the hydraulic pressure buffer chambers 16, 16' and the inlet of the reservoir 3, it will be assured that hydraulic operating fluid will be supplied uninterruptedly to each of the secondary hydraulic pressure chambers 43, 43' and 53, 53' of the hydraulic pressure modulators 4 and 5 due to the quantity of hydraulic fluid which is accumulated within the hydraulic pressure buffer chambers 16, 16'. Also, air entrained in the interior of the hydraulic fluid line 9 will be blocked at the hydraulic pressure buffer chambers 16, 16' so as to prevent it from being brought into the hydraulic pressure modulators 4 and 5.

In addition, hydraulic pressure modulators 4 and 5 are specifically located in a staggered relationship with one above the other. By virtue of such arrangement of the hydraulic pressure modulators 4, 5 and the hydraulic pressure buffer chambers 16, 16', there is provided an advantageous hydraulic fluid circuit construction such that, when air is entrapped in the hydraulic fluid lines 15, 15' which connect the hydraulic pressure modulators 4 and 5 and the part of the fluid line which communicates the hydraulic pressure modulator 5 and the hydraulic pressure buffer chambers 16, 16', this air will automatically be relieved upwardly, instead of being left entrapped within the hydraulic fluid lines. Also, the suction joint portion or inlet of the hydraulic fluid line 9 into the reservoir 3 is at a higher position than the level of the hydraulic pressure buffer chambers 16, 16', so that air entrapped in the inside of the hydraulic fluid line 9 will automatically be relieved upwardly to the reservoir 3 so as to be discharged therefrom.

Figure 3:
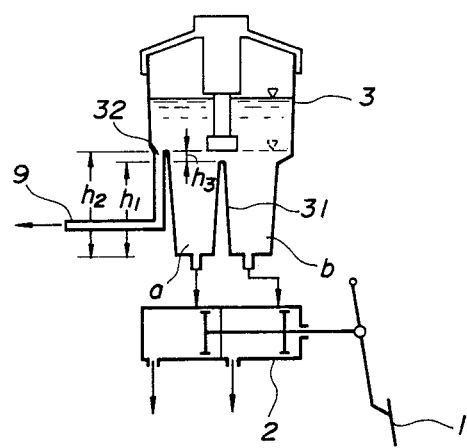
FIG. 3 is a schematic view in cross section showing the practical construction of a reservoir of a master brake cylinder according to the present invention.

Accordingly to the preferred embodiment of the present invention, as typically shown in FIG. 3, the master brake cylinder 2 of the dual-chamber type specifically is constructed such that the hydraulic operating fluid may be delivered from two lower subchambers a, b of the reservoir 3 which are separated by way of a partition wall 31. An inlet 32 from the hydraulic fluid line 9 opens into the reservoir at a higher position than the level of the upper end of the partition wall 31. With this arrangement, when the hydraulic fluid line 9 is broken such that hydraulic operating fluid leaks outwardly, the amount of leaked fluid reaches merely a level $h_2$ of the communicating hole 32 of the hydraulic fluid line 9. The hydraulic operating fluid at a height of $h_3$ higher than the level $h_1$ of the uppermost portions of the subchambers a, b will not leak. As a consequence, the supply of the hydraulic operating fluid to the master brake cylinder 2 is assured, whereby the regulation of the hydraulic braking pressure at the hydraulic pressure modulators 4, 5 will constantly be maintained, thus resulting in a positive hydraulic braking function during a cruising operation of the vehicle. In addition, a fluid level monitor is provided to give a warning to the vehicle operator when the quantity of the hydraulic operating fluid in the interior of the reservoir 3 decreases below a desired leved due to fluid leakage from the hydraulic fluid line 9.

Furthermore, according to the specific embodiment of the present invention shown in FIG. 2, there is provided in the hydraulic fluid line 9 a reduced size orifice which is formed by choking or restriction of a portion of the hydraulic fluid line 9.

With the provision of orifice 17 in the hydraulic fluid line 9, the secondary hydraulic pressure chambers 43, 43' and 53, 53' of the hydraulic pressure modulators 4 and 5 will be assured of being filled with the hydraulic operating fluid. More specifically, the hydraulic operating fluid is supplied from the relieved hydraulic fluid chambers 44, 44' and 54, 54' to the secondary hydraulic pressure chambers 43, 43' and 53, 53' by the pumping action of the hydraulic cylinders rods 42, 42' and 52, 52' of the hydraulic pressure modulators 4 and 5 when the brake pedal 1 is depressed, while the hydraulic operating fluid within the relieved hydraulic fluid chambers 44, 44' and 54, 54' will be directed back to the reservoir 3 when the hydraulic cylinders rods 42, 42' and 52, 52' are forced back to their original positions by the urging force of the springs. At this moment, the hydraulic operating fluid is throttled by the orifice 17, thus restricting the return of the hydraulic operating fluid to the reservoir 3, and thus assuring an effective charge of the hydraulic operating fluid into the secondary hydraulic pressure chambers 43, 43' and 53, 53'. With such advantageous structure of this embodiment, though there occurs a reverse flow of the hydraulic operating fluid from the relieved hydraulic fluid chambers 44, 44' and 54, 54' to the reservoir 3 when adjusting the hydraulic braking force by the hydraulic pressure modulators 4 and 5, there will be no obstacle to the regulation of the hydraulic braking force due to the presence of the orifice 17, since the anti-lock braking fluid control chambers 46, 56 are under a substantial pressure.

It is also noted from the construction of the anti-lock braking system according to the present invention that the hydraulic operating fluid is forced from the relieved hyraulic fluid chambers 44, 44' and 54, 54' to the secondary hydraulic pressure chambers 43, 43' and 53, 53' by repeatedly depressing the brake pedal 1, while releasing the entrapped air from within the hydraulic fluid line 9 by using air vent valves disposed at appropriate positions in the hydraulic brake system not only during the normal braking operation of the vehicle, but also during the construction of the hydraulic fluid line 9 during manufacture at the factory. During such construction, the provision of the orifice 17 in the hydraulic fluid line 9 can further afford a smooth introduction of the hydraulic operating fluid into the secondary hydraulic pressure chambers 43, 43' and 53, 53'.

Therefore, a plurality of orifices 17 may be provided at several appropriate positions in the hydraulic fluid line 9, and the cross-sectional areas of such orifices may be changed with respect to each other, thereby promoting the venting of air and the smooth introduction of the hydraulic operating fluid into the secondary hydraulic pressure chambers.

As fully described hereinbefore, according to the advantageous construction of the hydraulic fluid circuit for the anti-lock braking system of the present invention, wherein each of the relieved hydraulic fluid chambers of the hydraulic pressure modulators and the master brake cylinder are connected operatively by way of a hydraulic fluid line, so that hydraulic operating fluid within the relieved hydraulic fluid chambers may efficiently be returned to the reservoir during the regulation of the hydraulic braking force at the hydraulic pressure modulators, thus relieving part of the hydraulic braking force, there is achieved the advantage that air entrapped in the hydraulic fluid line may efficiently be removed. Such entrapped air is prevented from being introduced into the secondary hydraulic pressure chambers of the hydraulic pressure modulators, which otherwise would result in a possible reduction of the braking force of the system, by virtue of the provision of the reservoir of the master brake cylinder at a higher position than the level of the connection with the relied fluid chambers of the hydraulic pressure modulators.

Also, since the buffer chambers accumulate the hydraulic operating fluid at a higher position than the level of the relieved hydraulic fluid chambers of the hydraulic pressure modulators in the hydraulic fluid line, air entrapped within such fluid line is efficiently prevented from being passed into the secondary hydraulic pressure chambers of the hydraulic pressure modulators, which otherwise would result in a possible reduction of the braking force of the system.

In addition, the location of the communicating hole into the reservoir from the hydraulic fluid line at a higher position than the level of the chambers to supply the hydraulic operating fluid into the master brake cylinder, results in the advantage that when there occurs a leak of the hydraulic operating fluid from the hydraulic fluid system, a necessary supply of the hydraulic operating fluid is efficiently maintained in the hydraulic fluid system, thus assuring the reliable braking performance of the brake system.

Furthermore, the provision of an orifice in at least one appropriate position in the hydraulic fluid line ensures that the hydraulic operating fluid can be filled into the interior of the secondary hydraulic fluid chambers, and that air may efficiently be prevented from being entrapped in the secondary hydraulic fluid chambers. This eventually provides the advantage that the hydraulic braking force may be efficiently regulated to a desired extent of precision.

Certain changes and modifications may be made to the foregoing description without departing from the spirit and scope of the invention, it being intended that all matter contained in the foregoing description or shown in the accompanying drawings shall be interpreted as illustrative and not in any way limiting.

It also is to be understood that the appended claims are intended to cover all generic and specific features particular to the invention as disclosed herein and all statements relating to the scope of the invention, which as a matter of language might be said to fall thereunder.

What is claimed is:

1. In an anti-lock braking system of the type including a master brake cylinder for applying braking pressure, said master brake cylinder having a hydraulic fluid reservoir, hydraulic pressure modulator means for regulating the braking pressure to prevent brake locking, said modulator means having a relieved hydraulic fluid chamber, and hydraulic fluid line means operatively connecting said relieved hydraulic fluid chamber to said master brake cylinder for transferring hydraulic fluid in said relieved hydraulic fluid chamber to said reservoir during regulation of the braking pressure, the improvement comprising:

means for preventing air trapped within said fluid line means from being transferred to said modulator means, said preventing means comprising said reservoir being positioned entirely at a location above an inlet connection of said fluid line means to said master brake cylinder, whereby such trapped air is caused to move upwardly by its buoyancy through said fluid line means and said reservoir;

means for, in the event of the occurrence of a leak in said fluid line means, ensuring a required supply of hydraulic fluid for said relieved hydraulic fluid chamber, said ensuring means comprising buffer chamber means in said fluid line means for accumulating therein hydraulic fluid, said buffer chamber means being positioned at a level below said inlet connection; and means for throttling the flow of hydraulic fluid from said relieved hydraulic fluid chamber to said reservoir, and thereby for preventing depletion of the accumulation of hydraulic fluid in said buffer chamber means, said throttling means comprising a restriction of the internal size of said fluid line means, said restriction being located between said buffer chamber means and said inlet connection.

* * * * *